United States Patent [19] … [11] 4,317,580
Scarnato et al. … [45] Mar. 2, 1982

[54] HITCH ADAPTER

[75] Inventors: Thomas J. Scarnato, Barrington; Manfried L. Hoch, Romeoville; Robert C. Miner, Clarendon Hills, all of Ill.

[73] Assignee: International Harvester Company, Chicago, Ill.

[21] Appl. No.: 143,660

[22] Filed: Apr. 25, 1980

[51] Int. Cl.³ .............................................. B60D 1/02
[52] U.S. Cl. .............................. 280/415 R; 280/515; 411/155
[58] Field of Search ............... 280/415 A, 415 R, 457, 280/506, 515; 180/14 R; 411/121, 120, 119, 154, 155, 156

[56] References Cited

U.S. PATENT DOCUMENTS

| | | | |
|---|---|---|---|
| 320,641 | 6/1885 | Davies | 411/155 X |
| 2,525,471 | 10/1950 | Balzer | 280/515 X |
| 3,557,892 | 1/1971 | Burrough | 180/14 R |
| 4,008,905 | 2/1977 | Soteropulos et al. | 280/506 |
| 4,156,473 | 5/1979 | Myers et al. | 180/14 R |
| 4,195,704 | 4/1980 | Bass et al. | 180/14 R |

OTHER PUBLICATIONS

Rear Power Take-Off for Agricultural Tractors-SAE J1170, Society of Automotive Engineers, 1977.

Primary Examiner—John A. Pekar
Attorney, Agent, or Firm—Dennis K. Sullivan; F. David AuBuchon

[57] ABSTRACT

An improved hitch adapter for connecting an implement to a tractor drawbar including an adapter bar having a hitch member extending rearwardly of the drawbar, a spring locking bar disposed on the adapter bar, and a lower support member having a bolt attached thereto and extending upwardly through the drawbar, adapter bar, and locking bar, a second bolt socketed in the lower support member and extending through the drawbar, adapter bar, and locking bar. When the nut on the first bolt is made finger tight, the nut on the second bolt may be torqued using a single wrench simultaneously tensioning the first bolt to lock the adapter bar on the drawbar.

6 Claims, 3 Drawing Figures

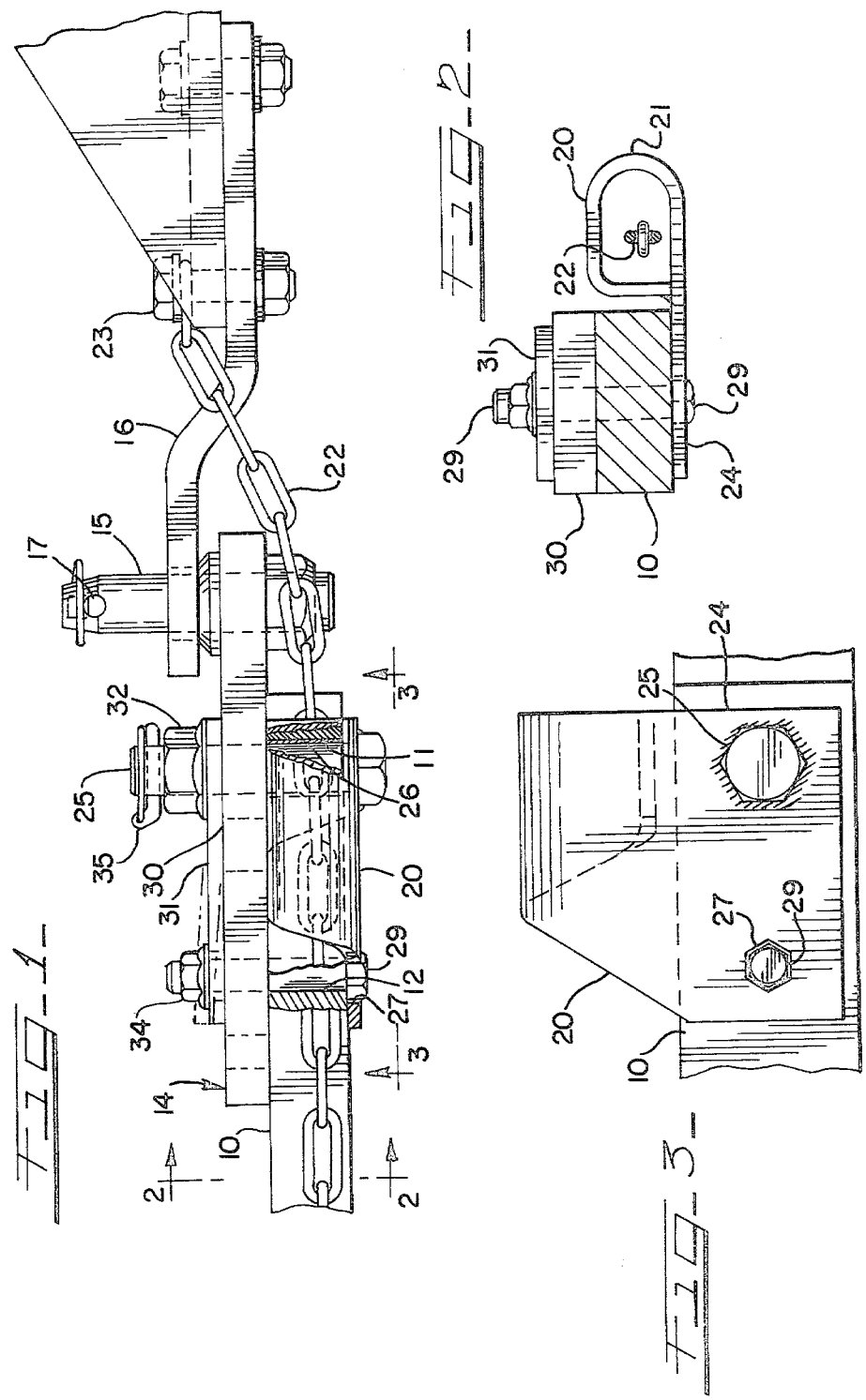

HITCH ADAPTER

BACKGROUND OF THE INVENTION

This invention relates to a hitch adapter for connecting a tractor drawbar to the tongue of a trailing implement for the purpose of locating the articulation axis between the tractor and the implement equidistantly between the front and rear universal joints of the power take-off shaft assembly that connects the tractor power take-off to the implement drive shaft.

The use of such hitch adapters results in equal angles of articulation of the front and rear joints and thereby eliminates speed variations and vibrations in the implement drive train which would exist if the angles were not equal. Hitch adapters are described in various patents, such as U.S. Pat. Nos. 3,557,892, 4,008,905, and 4,156,473. These exemplify various types of quick-attach designs which, in an attempt to accommodate the wide varieties of drawbar shapes and thickness available in agricultural tractors while maintaining a snug fit, tend to produce complex, heavy, and expensive structures.

Less of a problem than drawbar shape are the drawbar holes which are somewhat standardized in Society of Automobile Engineers Standard No. SAE J1170 (A.S.A.E. S338).

The simplest and lowest cost hitch adapter design is a bolt-on extension bar which moves the main hitch point between the implement and tractor rearward. However, the major obstacle to this type of design is that installation and removal is more time consuming than a quick-attach design and requires the use of multiple wrenches to achieve satisfactory rigidity between the hitch adapter and the tractor drawbar.

SUMMARY OF THE INVENTION

In accordance with the present invention, there is provided an improved hitch adapter for connecting the forward end of a trailed implement to the tractor drawbar to provide equal articulation of the universal joints of the drive shaft extending between the implement and tractor. More specifically, there is provided an improved means for locking the bolts which clamp the adapter to the drawbar in the form of a pre-bent spring locking bar which simultaneously tensions the one bolt while other bolt is being torqued with a wrench. Another feature of the invention resides in the provision of a lower support member which is integrally connected to the head of one of the bolts and which is provided with a polygonal hole forming a socket for the head of the other bolt. Through the use of this hitch adapter, the adapter may be easily attached to the drawbar and the bolts tensioned using only one wrench.

BRIEF DESCRIPTION OF THE DRAWINGS

Other objects and advantages of the invention will be apparent upon reading the detailed description of the preferred embodiment and upon reference to the drawings in which:

FIG. 1 is a side view, partly in section, of the rear portion of a tractor drawbar and the forward portion of an implement joined together by a hitch adapter incorporating the present invention;

FIG. 2 is a sectional view of the hitch adapter of FIG. 1 taken along the line 2—2 thereof; and FIG. 3 is a bottom view of the hitch adapter of FIG. 1 illustrating the lower support member.

DESCRIPTION OF THE PREFERRED EMBODIMENT

Referring to the drawings, there is shown the rear portion 10 of a tractor drawbar which is generally of rectangular cross-section although other shapes are possible as long as the upper and lower faces are horizontal. In accordance with the above-mentioned standard SAE J1170, the rear of the drawbar is provided with a vertical hitch pin hole 11 and a smaller auxiliary hole 12 a standardized distance forward of the hitch pin hole 11. A hitch adapter assembly 14 is mounted to the end of the drawbar and extends rearwardly therefrom to a distal end whereat a vertical hitch pin 15 is bolted thereto. The forward end of the implement tongue 16 is mounted on the hitch pin 15, being retained by a self-locking pin 17, so that the implement articulates relative to the tractor about the axis of the pin 15, which, as is well known with these adapters, is located midway between the axis of articulation of the universal joints of the PTO shaft (not shown) connecting the tractor and the implement.

Returning to the hitch adapter assembly 14, it will be seen that a lower support member 20 is provided with a rolled over portion 21 for enclosing a safety chain 22 which is bolted to the implement as at 23 and extends forwardly through the rolled-over portion 21 of the lower support member to a connection (not shown) with the tractor. The lower support member 20 is further provided with a flat, generally rectangular portion 24 having a large bolt 25 welded thereto and extending upwardly therefrom through the drawbar hitch pin hole 11, a suitable spacer 26 being provided between the bolt 25 and the hole 11 if necessary to accommodate a larger size hitch pin hole. The forward portion of the lower support member 20 is provided with a polygonal hole 27 so located and of such a size as to function as a socket retaining the head of a smaller bolt 29 extending upwardly through the auxiliary hole 12 of the drawbar 10 in relatively close fitting relation. Mounted on top of the drawbar on the bolts 25, 29 is an elongated hitch adapter bar 30 of rectangular cross section and having a plurality of holes to align with the drawbar holes 11, 12. On top of the adapter bar 30 is a locking bar 31 comprising a strip of spring steel of approximately 5/16 of an inch thickness, the locking bar being pre-bent to a normally non-planar condition by approximately its own thickness out of its own plane. A large nut 32 and a smaller nut 34 are mounted on the ends respectively of the bolts 25 and 29. To provide a fail-safe back-up, or in the event that a safety chain 22 is not used, a self-locking pin 35 is inserted diametrically through the end of the bolt 25 so that a connection is always maintained between the implement tongue 16 and the drawbar 10.

In operation, when it is desired to attach the hitch adapter assembly 14 to the drawbar 10, the lower support member 20 is pushed up against the bottom of the drawbar with the bolt 25 extending up through the hitch pin hole 11. The hitch adapter bar 30 and lock bar 31 are stacked on the bolt 25 and the auxiliary hole bolt 29 is inserted and through the lower support member 20, the hole 12, adapter bar 30 and lock bar 31. The nuts 32 and 34 are loosely assembled on the bolts to maintain the parts in alignment. The larger nut 32 is then hand tightened until it is finger tight. A serrated flange lock nut is preferred for the larger nut 32, although other types of nuts could be used to provide greater hand leverage. The head of the bolt 29 is drawn up into the socket hole 27 in the support and the nut 34 is then tightened using a wrench until the locking bar 31 is drawn up tight against the hitch adapter bar 30 thereby providing tension on the bolt 25 and locking the nut 32. The self-locking pin 35 is inserted in the bolt 25 and the safety chain 22 is passed through the lower support member 20 and connected to the tractor.

It will be seen that since the nut 32 is only hand tightened and the bolt head 29 is retained by the hole 27 in the lower support member 20, that only one wrench is required to tighten the hitch adapter on the drawbar. Further, the hitch adapter bar 30 is provided with a variety of holes and also may be installed beneath the drawbar, but above the lower support member 20, to provide different positions of the hitch pin for use with different speed and/or category power take-off assemblies.

Thus, there has been provided in accordance with the invention, a hitch adapter which fully meets the objects, aims and advantages set forth above. It is recognized that in view of the foregoing description those with ordinary skill in the art will note many modifications which may be made without departing from the scope of the invention. Accordingly it is intended to embrace all such modifications within the appended claims.

What is claimed is:

1. A hitch adapter for attaching a trailing implement to a tractor, said tractor having a rearwardly extending drawbar including horizontal top and bottom surfaces, a vertical hitch pin hole, and a vertical auxiliary hole spaced from the hitch pin hole, comprising:

an elongated adapter bar disposed adjacent said drawbar, said hitch adapter having a plurality of holes aligned respectively with said hitch pin hole and said auxiliary hole of said drawbar, said hitch adapter extending rearwardly of said drawbar to hitch means adjacent its distal end adapted to receive the tongue of said trailing implement and provide an axis of articulation between the tractor and the implement;

a spring steel locking bar having a plurality of holes aligned respectively with said drawbar holes disposed above said adapter bar, said locking bar being pre-bent to a normally non-planar condition;

a first bolt means extending through one of the respective holes in said drawbar, said adapter bar, and said locking bar and having a nut disposed in finger tight adjacent relation to said locking bar;

a second bolt means extending through the other of said holes in said drawbar, said adapter bar, and said locking bar, said second bolt having a nut and being tensioned to flatten said locking bar thereby tensioning said first bolt means; and a lower support member disposed in clamped relationship beneath said drawbar, one of said bolt means being secured to said support member.

2. The invention in accordance with claim 1 and said lower support member including means for retaining a safety chain extending between said tractor and said implement.

3. The invention in accordance with claim 1 and said lower support member having a polygonal hole so sized and located as to form a socket for the head of the other of said bolt means.

4. The invention in accordance with claim 1 or claim 3 and said first and second bolt means being of different diameters and having different size nuts thereon.

5. A hitch adapter for attaching a trailing implement to a tractor, said tractor having a rearwardly extending drawbar including horizontal top and bottom surfaces, a vertical hitch pin hole, and a smaller vertical auxiliary hole spaced from the hitch pin hole, comprising:

an elongated adapter bar disposed adjacent said drawbar, said hitch adapter having a plurality of holes aligned respectively with said hitch pin hole and said auxiliary hole of said drawbar, said hitch adapter extending rearwardly of said drawbar to a hitch means adjacent its distal end adapted to receive the tongue of said trailing implement and provide an axis of articulation between the tractor and implement;

a spring steel locking bar having a plurality of holes aligned respectively with said drawbar holes disposed above said adapter bar, said locking bar being pre-bent to a normally non-planar condition;

a large bolt means extending through said vertical hitch pin hole and said drawbar, said adapter bar, and said locking bar and having a nut disposed to effect clamping of said locking bar, adapter bar and drawbar; and a smaller bolt means extending through said vertical auxiliary hole in said drawbar, said adapter bar and said locking bar said second bolt means having a nut for effecting clamping of said locking bar, adapter bar and drawbar, said bolts and nuts being so disposed that said larger bolt means may be disposed in finger tight adjacent relation to said locking bar and tensioned by said smaller bolt means drawn up with a wrench to flatten said locking bar.

6. The invention in accordance with claim 5 and a lower support member disposed in clamped relation beneath said drawbar, said larger bolt means being secured to said support member.

* * * * *